(12) United States Patent
Harms

(10) Patent No.: US 10,432,127 B1
(45) Date of Patent: Oct. 1, 2019

(54) METHOD OF DISSIPATING REGENERATIVE ENERGY IN CARGO HANDLING SYSTEMS

(71) Applicant: GOODRICH CORPORATION, Charlotte, NC (US)

(72) Inventor: Scott Harms, Ypsilanti, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/192,110

(22) Filed: Nov. 15, 2018

(51) Int. Cl.
| | |
|---|---|
| *B65G 13/075* | (2006.01) |
| *H02P 27/024* | (2016.01) |
| *B64D 9/00* | (2006.01) |
| *G05F 1/56* | (2006.01) |
| *H02J 1/00* | (2006.01) |

(52) U.S. Cl.
CPC .............. *H02P 27/024* (2016.02); *B64D 9/00* (2013.01); *G05F 1/562* (2013.01); *B64D 2009/006* (2013.01); *H02J 2001/002* (2013.01)

(58) Field of Classification Search
CPC .. H02P 27/024; G05F 1/562; H02J 2001/002; B64D 2009/006; B64D 9/00; G05B 19/042; G06K 7/10366; B65G 13/071; B65G 13/075; B65C 1/20
See application file for complete search history.

(56) References Cited

U.S. PATENT DOCUMENTS

| | | | |
|---|---|---|---|
| 4,487,109 A | 12/1984 | Burandt et al. | |
| 7,014,038 B2 | 3/2006 | Leingang et al. | |
| 8,167,078 B2 * | 5/2012 | Futahashi | B60K 6/12 180/306 |
| 8,602,142 B2 | 12/2013 | Books et al. | |
| 9,694,978 B2 * | 7/2017 | Harms | B65G 13/075 |
| 9,932,112 B1 * | 4/2018 | Harms | B64D 9/00 |
| 10,023,387 B2 * | 7/2018 | Harms | B65G 13/075 |

FOREIGN PATENT DOCUMENTS

| | | |
|---|---|---|
| CN | 105253014 | 1/2016 |
| EP | 1200276 | 9/2006 |
| EP | 2968709 | 1/2016 |

* cited by examiner

*Primary Examiner* — Adolf D Berhane
(74) *Attorney, Agent, or Firm* — Snell & Wilmer, L.L.P.

(57) ABSTRACT

A cargo handling system is disclosed. In various embodiments, the cargo handling system includes a direct current power bus; a motor connected to the direct current power bus and having a flux reference input; a unit controller connected to the motor and configured to detect a level of regenerative energy on the direct current power bus and to alter the flux reference input in response to the level of regenerative energy.

20 Claims, 8 Drawing Sheets

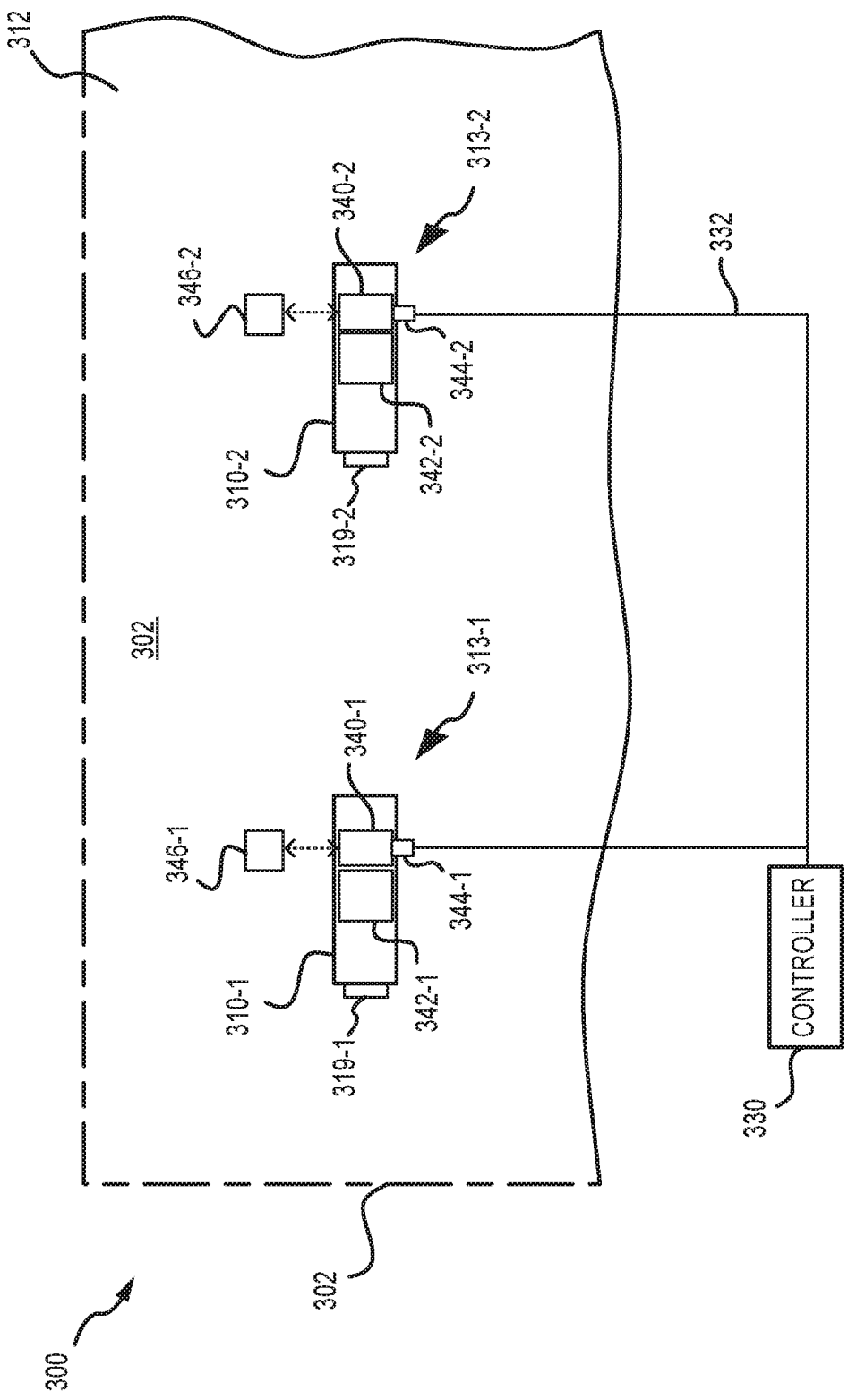

METHOD OF DISSIPATING REGENERATIVE ENERGY IN CARGO HANDLING SYSTEMS

FIELD

The present disclosure relates generally to cargo handling systems and, more particularly, to systems and methods used to control dissipation of regenerative energy when multiple power drive units share a common power supply or bus.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. This configuration facilitates transportation of the containers or pallets within the cargo compartment by one or more operators or agent-based systems controlling operation of the PDUs. In such systems, deceleration of a ULD when in contact with a PDU can result in a potentially damaging supply of regenerative to a direct current power bus shared by other PDUs.

SUMMARY

A cargo handling system is disclosed. In various embodiments, the cargo handling system includes a direct current power bus; a motor connected to the direct current power bus and having a flux reference input; a unit controller connected to the motor and configured to detect a level of regenerative energy on the direct current power bus and to alter the flux reference input in response to the level of regenerative energy.

In various embodiments, the unit controller is configured to generate a voltage difference between a power bus voltage and a threshold voltage. In various embodiments, a subtractor is configured to generate the voltage difference between the power bus voltage and the threshold voltage.

In various embodiments, the unit controller is configured to generate a voltage output equal to zero when the voltage difference is less than zero and proportional to the voltage difference when the voltage difference is greater than zero. In various embodiments, the voltage output is equal to zero when the voltage difference is less than zero and equal to the voltage difference when the voltage difference is greater than zero.

In various embodiments, the unit controller is configured to combine a voltage output, proportional to the voltage difference, with the flux reference input to generate a modified flux reference input. In various embodiments, the modified flux reference input is used to adjust a stator voltage across a stator winding of the motor.

In various embodiments, the unit controller includes a torque reference configured to adjust a speed of the motor.

In various embodiments, a system controller is connected to the unit controller and configured to operate the unit controller.

A system for dissipating regenerative energy on a power bus is disclosed. In various embodiments, the system includes a first motor connected to the power bus and having a first flux reference input; a first unit controller connected to the first motor and configured to detect a level of regenerative energy on the power bus and to alter the first flux reference input in response to the level of regenerative energy; a second motor connected to the power bus and having a second flux reference input; and a second unit controller connected to the second motor and configured to detect the level of regenerative energy on the power bus and to alter the second flux reference input in response to the level of regenerative energy.

In various embodiments, the first unit controller and the second unit controller are configured to generate a voltage difference between a power bus voltage and a threshold voltage. In various embodiments, the first unit controller and the second unit controller are configured to generate a voltage output proportional to the voltage difference when the voltage difference is greater than zero. In various embodiments, the voltage output is equal to zero when the voltage difference is less than zero.

In various embodiments, the first unit controller is configured to combine the voltage output with the first flux reference input to generate a first modified-flux reference input and the second unit controller is configured to combine the voltage output with the second flux reference input to generate a second modified-flux reference input. In various embodiments, the first modified-flux reference input is used to adjust a first stator voltage across a first stator winding of the first motor and the second modified-flux reference input is used to adjust a second stator voltage across a second stator winding of the second motor.

A method for dissipating regenerative energy on a power bus powering one or more of a plurality of motors is disclosed. In various embodiments, the method includes the steps of determining a voltage difference, the voltage difference representing a level of regenerative energy on the power bus; determining a voltage output proportional to the voltage difference; modifying a flux reference input based on the voltage output to produce a modified flux reference input; and adjusting a stator voltage across a stator winding of at least one of the plurality of motors.

In various embodiments, the at least one of the plurality of motors is a motor in a stationary mode. In various embodiments, the method includes adjusting the stator voltage across the stator winding of each of the plurality of motors. In various embodiments, the determining the voltage difference includes subtracting a threshold voltage level from a power bus voltage level. In various embodiments, the modifying the flux reference input based on the voltage output to produce the modified flux reference input includes combining the flux reference input with the voltage output equal to zero when the voltage difference is less than zero and proportional to the voltage difference when the voltage difference is greater than zero.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 3A and 3B illustrate a schematic view of a cargo deck having a cargo handling system with a plurality of PDUs, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
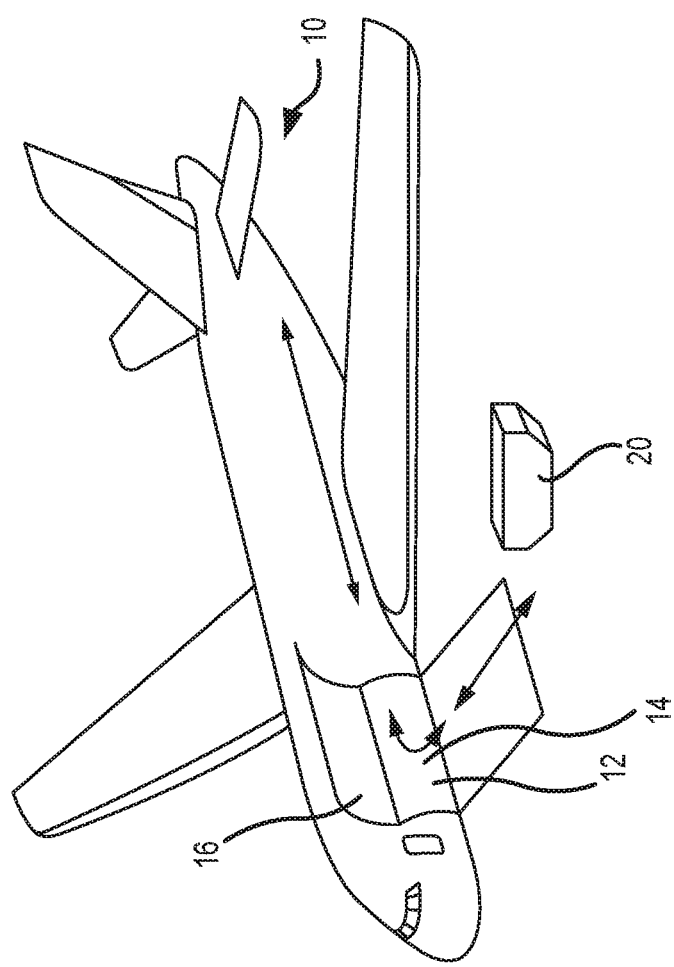
FIG. 1A illustrates a schematic view of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
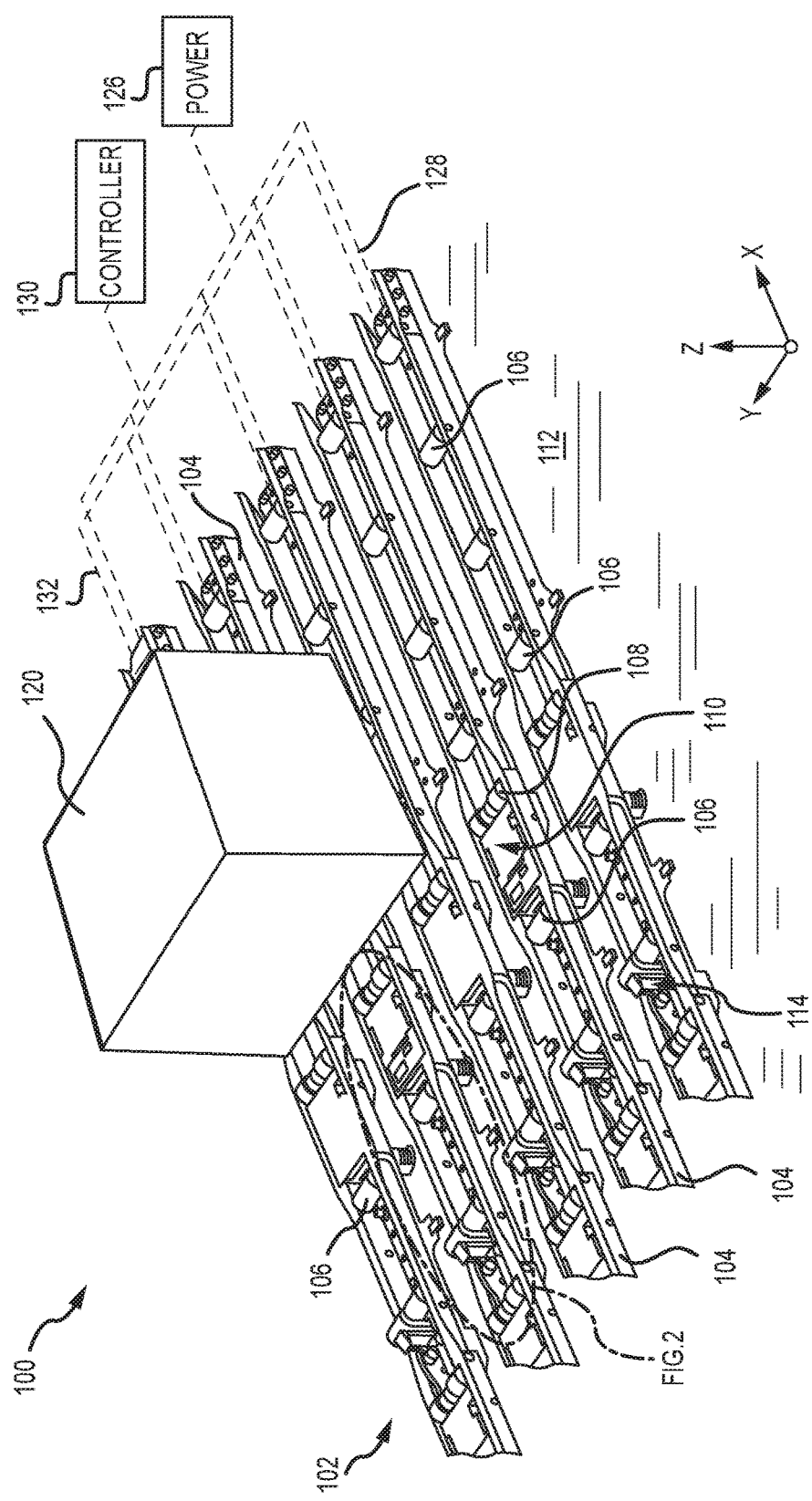
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position above the conveyance surface 102 by the corresponding PDU 110. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs 110, which can also be used in various embodiments of the present disclosure, may include a drive roller that is held or biased in a position above the conveyance surface by a spring. PDUs 110 as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power buses 128. As described below, in various embodiments, the system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
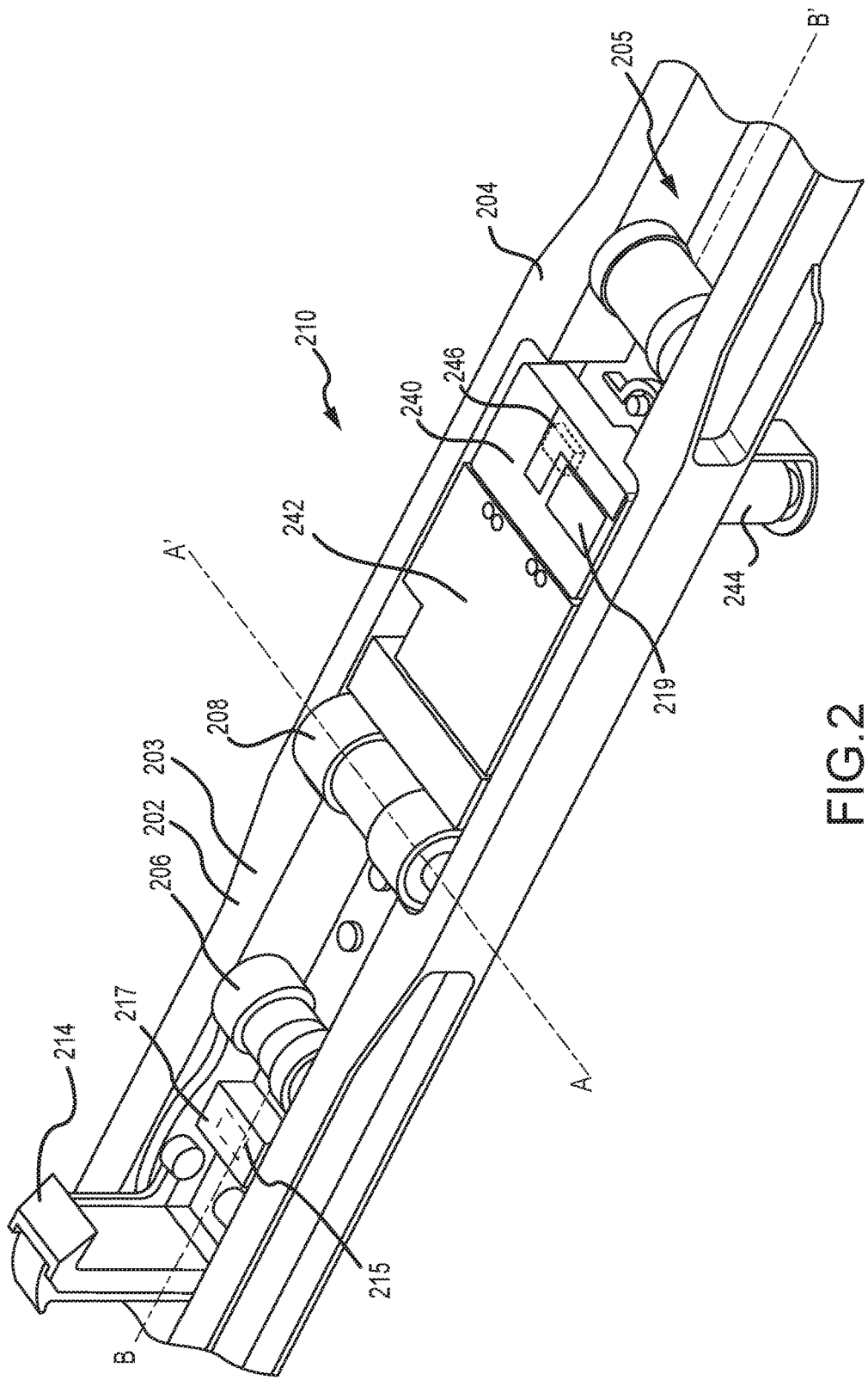
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programming. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD 120 may pass over the restraint device, and a deployed position (as illustrated), whereby the ULD 120 is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device, or RFID device 246, or similar device, configured to store, transmit or receive information or data—e.g., operational status or location data. Additionally, a ULD sensor 219 may be disposed within the tray 204 and configured to detect the presence of a ULD 120 as the ULD 120 is positioned over or proximate to the PDU 210 or the restraint device 214. In various embodiments, the ULD sensor 219 may include any type of sensor capable of detecting the presence of a ULD 120. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3A:
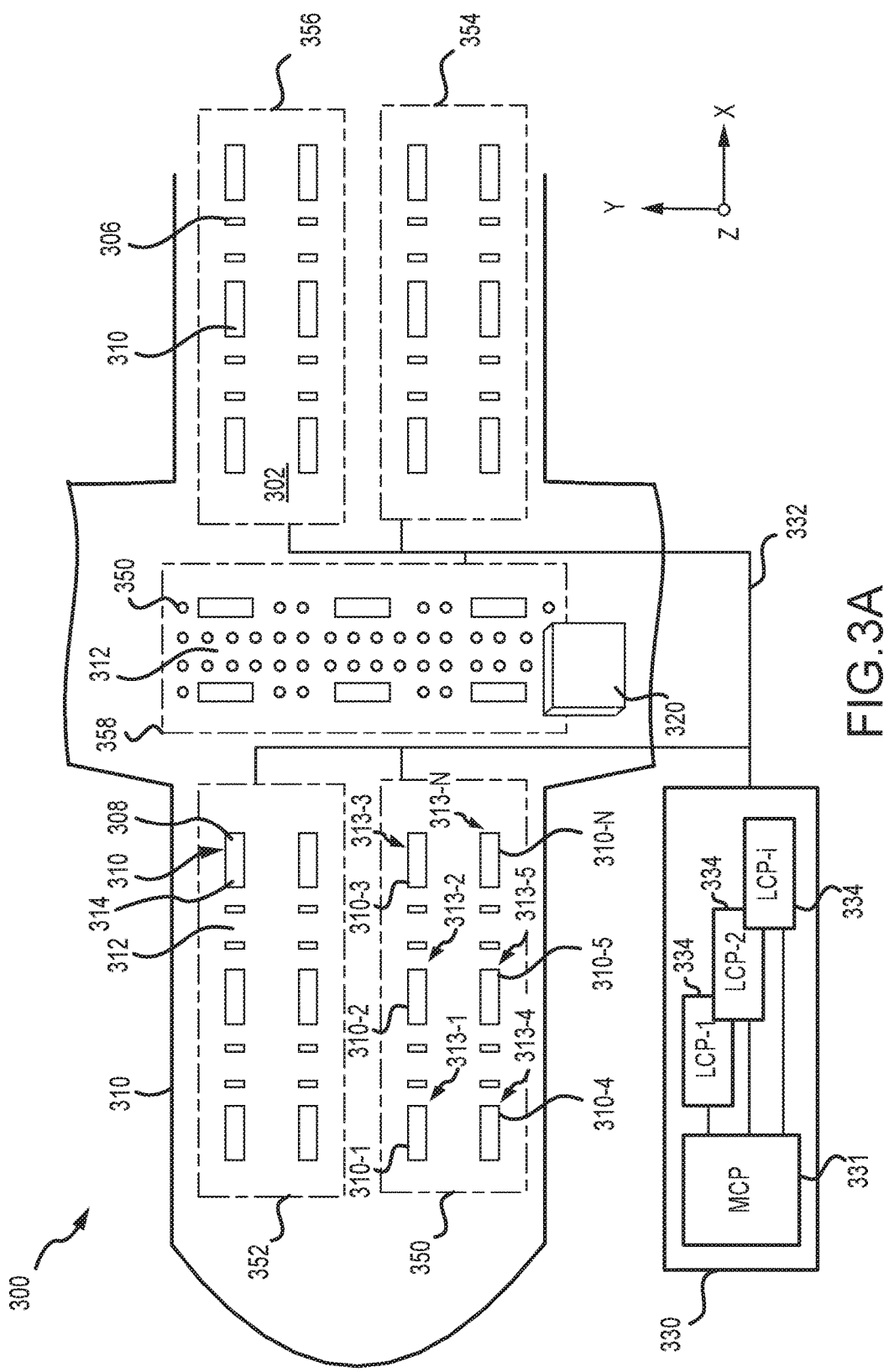

Referring now to FIG. 3A, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements and may include roller ball units 351 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 on to and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

With reference to FIG. 3B, a schematic view of a portion of the cargo handling system 300 and the cargo deck 312 is shown in accordance with various embodiments. By way of non-limiting example, the system controller 330 is configured to send a command signal through the channel 332 to at least the first PDU 310-1 and the second PDU 310-2 of the forward port-side section 350. The command signal may, for example, comprise an instruction to activate or deactivate a first motor 342-1 associated with the first PDU 310-1 or a second motor 342-2 associated with the second PDU 310-2. The command signal may also comprise a first address that corresponds to the first location 313-1 or a second address that corresponds to the second location 313-2. A first unit controller 340-1 of the first PDU 310-1 may receive the command signal through a first connector 344-1 and a second unit controller 340-2 of the second PDU 310-2 may receive the command signal through a second connector 344-2. Following receipt of the signal, the first unit controller 340-1 and the second unit controller 340-2 may determine whether the command is intended to affect operation of the first PDU 310-1 or the second PDU 310-2, respectively, by comparing a location address contained within the signal to a known address associated with the respective PDUs. In various embodiments, the first address associated with the first PDU 310-1 may be stored in a first RFID device 346-1 and the second address associated with the second PDU 310-2 may be stored in a second RFID device 346-2. Additionally, a ULD sensor, such as, for example, the ULD sensor 219 described above with reference to FIG. 2 may be disposed proximate each PDU and configured to detect the presence of a ULD as the ULD is positioned over or proximate to the PDU. Accordingly, a first ULD sensor 319-1 may be disposed proximate or within the first PDU 310-1 and a second ULD sensor 319-2 may be disposed proximate or within the second PDU 310-2.

Figure 4A:
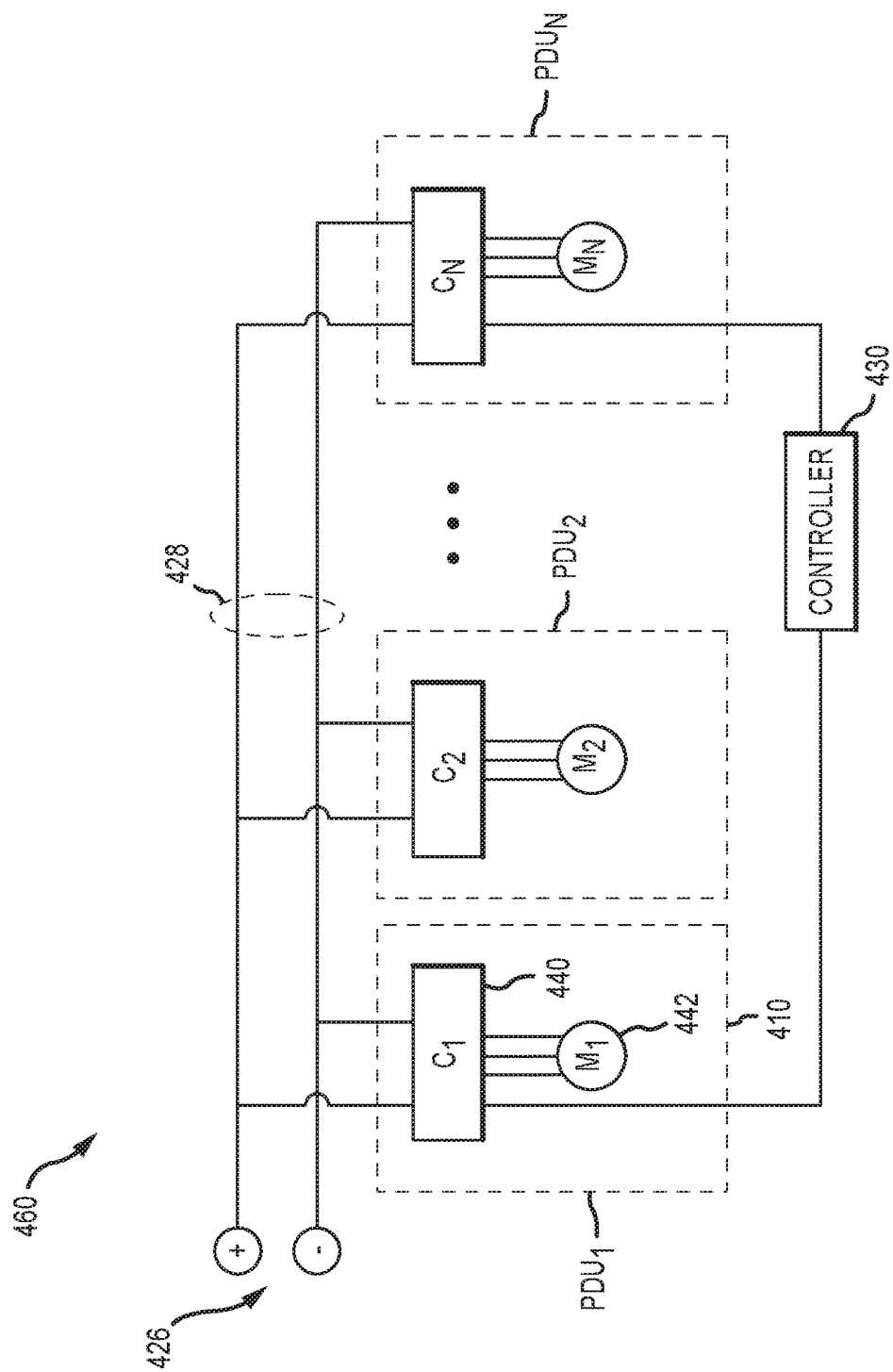
FIGS. 4A and 4B illustrate a regenerative energy dissipation system, in accordance with various embodiments.

Turning now to FIG. 4A, a schematic diagram of a regenerative energy system 460 is illustrated. In various embodiments, the regenerative energy system 460 is applicable to a cargo handling system, such as, for example, the cargo handling system 300 described above with reference to FIGS. 3A and 3B. The regenerative energy system 460 includes a plurality of motors 442, designated $M_1$, $M_2$ ... $M_N$, where N is the number of motors that share a common power bus. The regenerative energy system 460 also includes a plurality of unit controllers 440, designated $C_1$, $C_2$ ... $C_N$, each of which is associated with a corresponding one of the plurality of motors 442. In various embodiments, each of the plurality of motors 442 and each of the plurality of unit controllers 440 is similar, respectively, to the first motor 342-1 and the second motor 342-2 and to the first unit controller 340-1 and the second unit controller 340-2 described above with reference to FIGS. 3A and 3B. In various embodiments, each of the corresponding pairs of the plurality of unit controllers 440 and the plurality of motors 442 may be considered components of a plurality of PDUs 410, designated $PDU_1$, $PDU_2$ ... $PDU_N$, and are similar to the first PDU 310-1 and the second PDU 310-2 described above with reference to FIGS. 3A and 3B.

Still referring to FIG. 4A, a power source 426 may provide a supply of direct current power over a power bus 428. In various embodiments, the power source 426 and the power bus 428 are similar to the power source 126 and the one or more power buses 128 described above with reference to FIG. 1B. The power bus 428 provides direct current power to each of the plurality of PDUs 410. During operation and, in particular, during the loading or unloading of a ULD, circumstances may arise where one or more of the plurality of motors 442 is being driven by the ULD, rather than the one or more motors propelling the ULD. Such circumstances may arise, for example, when the conveyance surface (e.g., the conveyance surface 302 described above with reference to FIGS. 3A and 3B) is tilted at an angle with respect to a horizontal reference. In such circumstance, the potential energy of the ULD may cause a motor in contact with the ULD to be driven faster than specified by a corresponding controller. Driving the motor in such circumstance causes the motor to act similar to a generator, thereby generating energy (e.g., regenerative energy) and adding the energy back to the power bus 428, rather than removing energy from the power bus 428. A similar circumstance may arise during deceleration of a ULD, where the momentum of a moving ULD may cause the ULD to drive the motor, resulting in a portion of the kinetic energy of the ULD to be added to the power bus 428. A combination of the above circumstances may also occur, such as, for example, when decelerating a moving ULD that is being transported down a tilted conveyance surface.

Figure 4B:
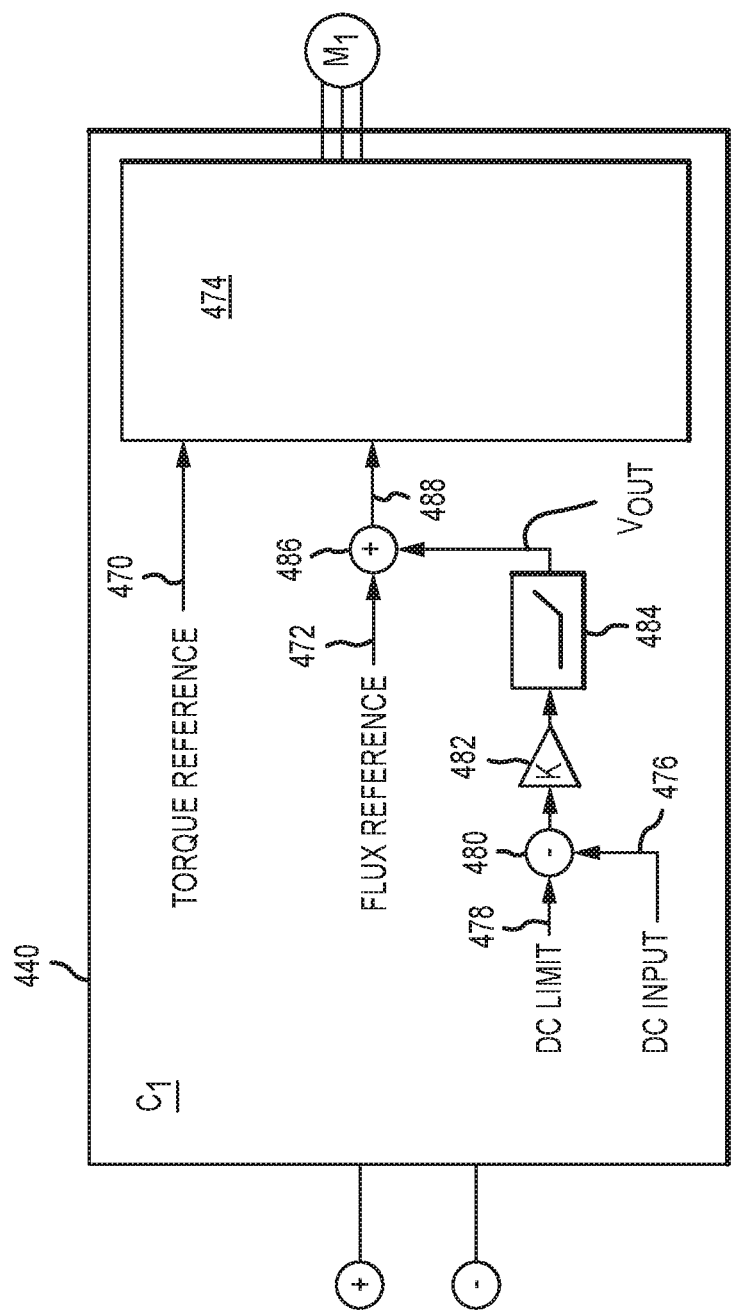

Referring now to FIG. 4B, a schematic diagram of one of the plurality of unit controllers 440 (e.g., the unit controller $C_1$) and one of the plurality of motors 442 (e.g., the motor $M_1$) is illustrated. The unit controller $C_1$ includes a torque reference input 470 and a flux reference input 472. In various embodiments, the torque reference input 470 is generally variable and is used to control the speed of the motor $M_1$. The flux reference input 472 is generally fixed and is used to control the strength of the magnetic field in the motor $M_1$. The unit controller C1 also includes a motor control circuit 474, such as, for example, a vector control circuit of a field oriented control circuit used to control induction motors. As described herein, regenerative energy on the power bus 428 may be dissipated by varying the flux reference input 472. Consider, for example, the motor $M_1$ being in a stationary mode at a given time, while the motor $M_2$ is being driven (e.g., by a decelerating ULD). The motor $M_2$ is therefore producing a regenerative energy input to the power bus 428. A DC input 476 in the unit controller $C_1$ is used to sense the voltage on the power bus 428. When the voltage on the power bus is above a threshold value, e.g., a DC limit 478, the flux reference input 472 is adjusted to cause the regenerative energy to be dissipated, for example, as a greater resistive load through the coils comprising the stator winding in the motor $M_1$.

In various embodiments, a comparator, such as, for example, a subtractor 480, detects the presence of the regenerative energy on the power bus 428. In various embodiments, the subtractor 480 generates a voltage difference $V_{DIF}$ between the DC Input 476 and the DC Limit 478. The voltage difference $V_{DIF}$ is multiplied by a constant K in a multiplier 482 to generate a scaled voltage difference $V_{DIF*K}$, which value is then passed to a saturation block 484. The saturation block 484 provides an output voltage $V_{OUT}$ that depends on whether the scaled voltage difference $V_{DIF*K}$ is less than or equal to zero or greater than zero. If the scaled voltage difference $V_{DIF*K}$ is less than or equal to zero, the output voltage $V_{OUT}$ is set to zero. If the scaled voltage difference $V_{DIF*K}$ is greater than zero, the output voltage $V_{OUT}$ is set to the scaled voltage difference $V_{DIF*K}$. In various embodiments, the scaled voltage difference $V_{DIF*K}$ is linearly proportional to the voltage difference $V_{DIF}$. An adder 486 is then used to add the output voltage $V_{OUT}$ to the flux reference input 472 to generate a modified flux reference input 488. When the modified flux reference input 488 exceeds the flux reference input 472, additional voltage is applied to the stator winding within the motor M1, resulting in an increased resistive loss within the stator winding (due, for example, to Joule or resistive heating), thereby dissipating the regenerative energy on the power bus 428.

In various embodiments, a controller 430, such as, for example, the system controller 330 described above with reference to FIG. 3A, may be configured to sense the presence of regenerative energy on the power bus 428 and to select one or more of the plurality of unit controllers 440 to dissipate the regenerative energy. For example, the controller 430 may be configured to select one or more of the plurality of unit controllers 440 from a subset of the controllers that are in a stationary mode. In various embodiments, no assistance from the controller 430 is required, as each of the plurality of unit controllers 440, as described above, may be configured to sense an excess voltage on the power bus 428 and generate the modified flux reference input 488. In various embodiments, each of the plurality of unit controllers 440 may generate the modified flux reference input 488, corresponding to an associated power drive unit, regardless of whether the associated motor is currently operating or in a stationary mode.

Figure 5:
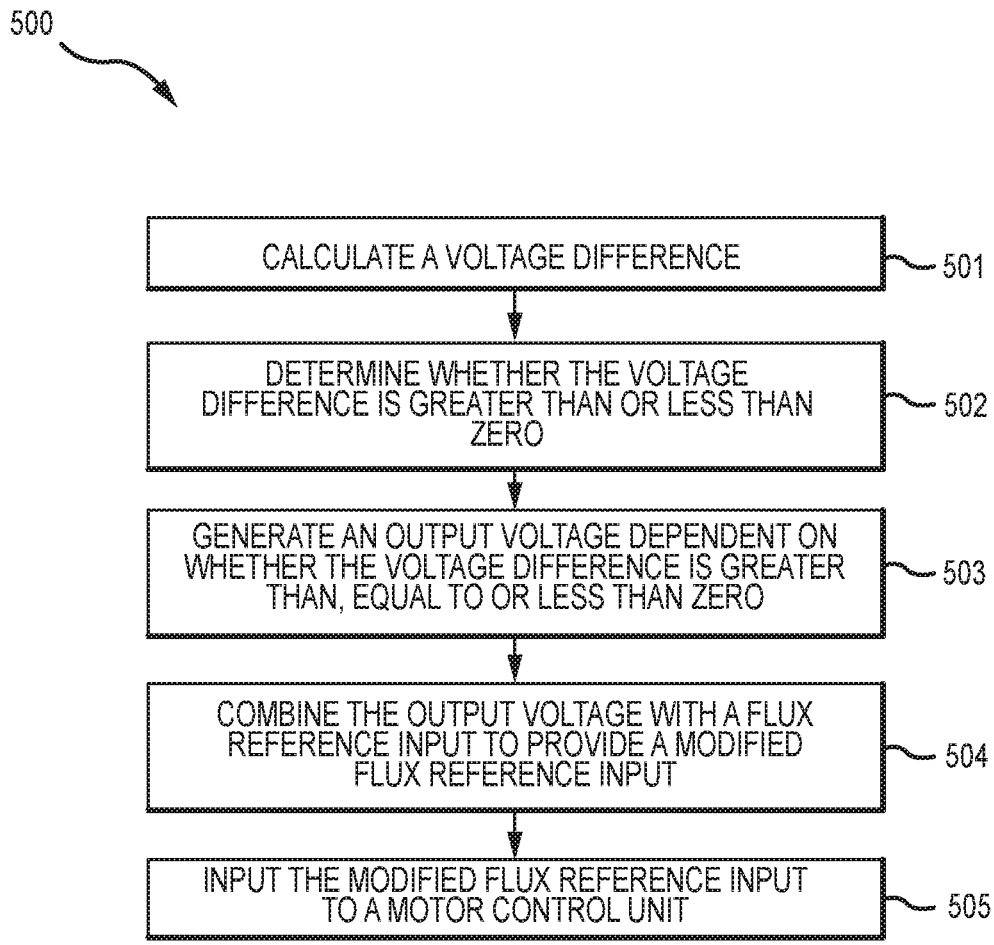
FIG. 5 illustrates a method for dissipating regenerative energy on a power bus powering one or more of a plurality of motors, in accordance with various embodiments.

Referring now to FIG. 5, a method for dissipating regenerative energy on a direct current power bus 500 powering one or more of a plurality of motors is described. In various embodiments, the method includes the following steps. At a first step 501, the presence of regenerative energy on the power bus is detected. In various embodiments, the presence of regenerative energy may be detected using a subtractor configured to generate a voltage difference between the voltage on the power bus and a threshold voltage. In a second step 502, the voltage difference may be passed to a saturation block configured to detect whether the voltage difference is greater than, equal to or less than zero. A comparator may similarly be used to detect whether the voltage difference is greater than, equal to or less than zero. The voltage difference may also be scaled by a constant using a multiplier to generate a scaled voltage difference prior to entering the saturation block.

In a third step 503, the saturation block generates a voltage output equal to zero for cases where the voltage difference is less than or equal to zero or equal to the voltage difference or scaled voltage difference for cases where the voltage difference is greater than zero. In a fourth step 504, the output voltage is combined with a flux reference input to provide a modified flux reference input. The modified flux reference input is equal to the flux reference input for cases where the voltage difference is less than or equal to zero or equal to the flux reference input plus the voltage difference or scaled voltage difference for cases where the voltage difference is greater than zero. At a fifth step 505, the modified flux reference input is input to a motor control unit such that additional voltage is applied to the stator winding within the motor corresponding to the motor control unit for cases where the voltage difference is greater than zero. The additional voltage results in an increased resistive loss within the stator winding, thereby dissipating the regenerative energy on the power bus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
a direct current power bus;
a motor connected to the direct current power bus and having a flux reference input; and
a unit controller connected to the motor and configured to detect a level of regenerative energy on the direct current power bus and to alter the flux reference input in response to the level of regenerative energy.

2. The cargo handling system of claim 1, wherein the unit controller is configured to generate a voltage difference between a power bus voltage and a threshold voltage.

3. The cargo handling system of claim 2, wherein a subtractor is configured to generate the voltage difference between the power bus voltage and the threshold voltage.

4. The cargo handling system of claim 2, wherein the unit controller is configured to generate a voltage output equal to zero when the voltage difference is less than zero and proportional to the voltage difference when the voltage difference is greater than zero.

5. The cargo handling system of claim 4, wherein the voltage output is equal to zero when the voltage difference is less than zero and equal to the voltage difference when the voltage difference is greater than zero.

6. The cargo handling system of claim 2, wherein the unit controller is configured to combine a voltage output, proportional to the voltage difference, with the flux reference input to generate a modified flux reference input.

7. The cargo handling system of claim 6, wherein the modified flux reference input is used to adjust a stator voltage across a stator winding of the motor.

8. The cargo handling system of claim 7, wherein the unit controller includes a torque reference configured to adjust a speed of the motor.

9. The cargo handling system of claim 1, further comprising a system controller connected to the unit controller and configured to operate the unit controller.

10. A system for dissipating regenerative energy on a power bus, comprising:
a first motor connected to the power bus and having a first flux reference input;
a first unit controller connected to the first motor and configured to detect a level of regenerative energy on the power bus and to alter the first flux reference input in response to the level of regenerative energy;
a second motor connected to the power bus and having a second flux reference input; and
a second unit controller connected to the second motor and configured to detect the level of regenerative energy on the power bus and to alter the second flux reference input in response to the level of regenerative energy.

11. The system of claim 10, wherein the first unit controller and the second unit controller are configured to generate a voltage difference between a power bus voltage and a threshold voltage.

12. The system of claim 11, wherein the first unit controller and the second unit controller are configured to generate a voltage output proportional to the voltage difference when the voltage difference is greater than zero.

13. The system of claim 12, wherein the voltage output is equal to zero when the voltage difference is less than zero.

14. The system of claim 12, wherein the first unit controller is configured to combine the voltage output with the first flux reference input to generate a first modified-flux reference input and wherein the second unit controller is configured to combine the voltage output with the second flux reference input to generate a second modified-flux reference input.

15. The system of claim 14, wherein the first modified-flux reference input is used to adjust a first stator voltage across a first stator winding of the first motor and wherein the second modified-flux reference input is used to adjust a second stator voltage across a second stator winding of the second motor.

16. A method for dissipating regenerative energy on a power bus powering one or more of a plurality of motors, comprising:
determining a voltage difference, the voltage difference representing a level of regenerative energy on the power bus;
determining a voltage output proportional to the voltage difference;
modifying a flux reference input based on the voltage output to produce a modified flux reference input; and
adjusting a stator voltage across a stator winding of at least one of the plurality of motors.

17. The method of claim 16, wherein the at least one of the plurality of motors is a motor in a stationary mode.

18. The method of claim 16, further comprising adjusting the stator voltage across the stator winding of each of the plurality of motors.

19. The method of claim 17, wherein the determining the voltage difference includes subtracting a threshold voltage level from a power bus voltage level.

20. The method of claim 17, wherein the modifying the flux reference input based on the voltage output to produce the modified flux reference input includes combining the flux reference input with the voltage output equal to zero when the voltage difference is less than zero and proportional to the voltage difference when the voltage difference is greater than zero.

* * * * *